US010695884B2

(12) United States Patent
Yang et al.

(10) Patent No.: US 10,695,884 B2
(45) Date of Patent: Jun. 30, 2020

(54) TOOL WEAR MONITORING AND PREDICTING METHOD

(71) Applicant: NATIONAL CHENG KUNG UNIVERSITY, Tainan (TW)

(72) Inventors: Haw-Ching Yang, Tainan (TW); Fan-Tien Cheng, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 110 days.

(21) Appl. No.: 15/933,380

(22) Filed: Mar. 23, 2018

(65) Prior Publication Data

US 2018/0272491 A1 Sep. 27, 2018

Related U.S. Application Data

(60) Provisional application No. 62/475,889, filed on Mar. 24, 2017.

(51) Int. Cl.
| | |
|---|---|
| *B23Q 17/24* | (2006.01) |
| *B23Q 17/09* | (2006.01) |
| *H04L 12/24* | (2006.01) |
| *G05B 19/4065* | (2006.01) |
| *G05B 13/04* | (2006.01) |
| *G01N 3/58* | (2006.01) |
| *G06T 19/00* | (2011.01) |
| *H04L 29/08* | (2006.01) |

(Continued)

(52) U.S. Cl.
CPC ..... *B23Q 17/2457* (2013.01); *B23Q 17/0971* (2013.01); *B23Q 17/0995* (2013.01); *G01N 3/58* (2013.01); *G05B 13/048* (2013.01); *G05B 19/4065* (2013.01); *H04L 41/5041* (2013.01); *G05B 2219/32214* (2013.01); *G05B 2219/37252* (2013.01); *G06T 19/006* (2013.01); *H04L 61/2007* (2013.01); *H04L 67/02* (2013.01); *H04L 67/10* (2013.01); *H04L 69/325* (2013.01)

(58) Field of Classification Search
CPC ............ B23Q 17/2457; B23Q 17/0995; B23Q 17/0971; H04L 41/5041; H04L 67/10; H04L 67/02; H04L 61/2007; H04L 69/325; G01N 3/58; G05B 13/048; G05B 19/4065; G05B 2219/32214; G05B 2219/37252; G05B 2219/24065; G05B 23/0213; G06T 19/006; G06F 2009/45595; G06F 9/45558
See application file for complete search history.

(56) References Cited

U.S. PATENT DOCUMENTS 5,251,144 A * 10/1993 Ramamurthi ...... G05B 19/4065
  700/177
5,689,062 A * 11/1997 Jawahir .................... G01N 3/58
  700/175

(Continued)

*Primary Examiner* — Thomas C Lee
*Assistant Examiner* — Anzuman Sharmin
(74) *Attorney, Agent, or Firm* — CKC & Partners Co., LLC

(57) ABSTRACT

A tool wear monitoring and predicting method is provided, and uses a hybrid dynamic neural network (HDNN) to build a tool wear prediction model. The tool wear prediction model adopts actual machining (cutting) conductions, sensing data detected at the current tool run of operation and the predicted tool wear value at the previous tool run of operation to predict a predicted tool wear value at the current tool run. A cyber physical agent (CPA) is adopted for simultaneously monitoring and predicting tool wear values of plural machines of the same machine type.

9 Claims, 6 Drawing Sheets

(51) Int. Cl.
 H04L 29/12 (2006.01)
 G06F 9/455 (2018.01)
 G05B 23/02 (2006.01)

(56) References Cited

U.S. PATENT DOCUMENTS

| | | | |
|---|---|---|---|
| 2012/0303674 A1* | 11/2012 | Boensch | G06F 16/252 707/802 |
| 2016/0069775 A1* | 3/2016 | Thomson | G01M 13/045 702/179 |
| 2017/0032281 A1* | 2/2017 | Hsu | B23K 9/0953 |
| 2018/0245434 A1* | 8/2018 | Jacks | G05B 19/02 |

* cited by examiner

TOOL WEAR MONITORING AND PREDICTING METHOD

RELATED APPLICATIONS

This application claims the benefit of the Provisional Application Ser. No. 62/475,889, filed on Mar. 24, 2017. The entire disclosures of all the above applications are hereby incorporated by reference herein.

BACKGROUND

Field of Invention

The disclosure relates to a tool wear monitoring and predicting method, and more particularly, to a method of predicting a tool wear value and a remaining useful life (RUL) for a cutting tool.

Description of Related Art

Tool wear of a cutting tool mounted a tool machine is an important factor affecting accuracy of a workpiece that is processed by the tool machine. In a conventional plant, the measurement of the tool wear relies on a tool image monitored by a digital microscope, and the tool image is artificially judged to determine if tool replacement is required. If the cutting tool is replaced too early, the tool cost and calibration time will be increased. On the contrary, if the cutting tool is replaced too late, the workpiece being machined is likely to be out of spec (OOS) and is discarded. Hence, how to predict a tool wear situation in real time when the tool machine is in operation is critical to the improvement of machining efficacy.

On the other hand, a processing plant generally has several tool machines using the same cutting tool product (type). It takes a lot of time to judge the tool wear situations of the tool machines one by one, and it is quite likely that the cutting tools of the tool machines fail to be replaced in time. Hence, there is need to develop and provide a method for simultaneously monitoring and predicting cutting tool wear and cutting tool life for several tool machines.

SUMMARY

An object of the disclosure is to provide a tool wear monitoring and predicting method, thereby predicting a tool wear value and a RUL of a cutting tool mounted on a tool machine in real time when the tool machine is in operation.

Another object of the disclosure is to provide a tool wear monitoring and predicting method, thereby simultaneously monitoring and predicting cutting tool wear values and cutting tool life values of cutting tools respectively mounted on several tool machines by using a tool cyber-physical prediction (TCPP) scheme.

According to the aforementioned objects, an aspect of the disclosure is to provide a tool wear monitoring and predicting method. In this method, ranges of plural sets of factory machining conditions regarding a cutting tool product are first obtained, in which the ranges of the sets of factory machining conditions have plural boundary conditions. Then, plural life-determining operations are respectively performed on plural first cutting tools in accordance with the boundary conditions, thereby obtaining plural actual maximum tool life values of the cutting tool product operated at the boundary conditions, in which the first cutting tools have the same type as the cutting tool product, and in each of the life-determining operations, one of the first cutting tools is continuously operated from its brand new condition until it is completely inoperable. Thereafter, a maximum tool life (MTL) of a second cutting tool under a set of actual machining conditions is obtained in accordance with a Taylor's tool life equation by using the actual maximum tool life values and the boundary conditions, in which the second cutting tool has the same type as the cutting tool product. Then, plural historical tool runs of operation are sequentially performed using the second cutting tool under the set of actual machining conditions, thereby obtaining a relationship of actual tool wear to tool life, plural sets of historical sensing data and plural historical tool wear values, in which the historical tool wear values are corresponding to the sets of historical sending data and the historical runs of operation in a one-to-one manner. Then, a tool wear prediction model is built in accordance with a hybrid dynamic neural network (HDNN) algorithm by using the set of historical sensing data and the historical tool wear values. Then, Plural sets of sensing data of a third cutting tool that is sequentially performing tool runs of operation under the set of actual machining conditions are obtained, in which the third cutting tool has the same type as the cutting tool product, and the tool runs of operation are corresponding to the sets of sending data in a one-to-one manner. Thereafter, the sets of sensing data and the maximum tool life are inputted into the tool wear prediction model, thereby obtaining a tool wear predicted value of the third cutting tool after each of the tool runs of operation, in which, when the tool wear predicted value of the third cutting tool after the each of the tool runs of operation is desired to be predicted, the tool wear predicted value of the third cutting tool at the tool run of operation right before the each of the tool runs of operation is required to be inputted into the tool wear prediction model. Then, the third cutting tool is replaced with a new cutting tool when the tool wear predicted value is greater than or equal to a maximum tool wear threshold.

In some embodiments, the tool wear monitoring and predicting method further includes obtaining a tool life of the third cutting tool from the tool wear predicted value in accordance with the relationship of actual tool wear to tool life.

In some embodiments, the tool wear monitoring and predicting method further includes obtaining the maximum tool wear threshold from the maximum tool life in accordance with the relationship of actual tool wear to tool life.

In some embodiments, the tool wear monitoring and predicting method further includes calculating a remaining useful life (RUL) of the third cutting tool by using the tool wear predicted value, the maximum tool life and the maximum tool wear threshold.

In some embodiments, the historical tool runs of operation are the same as the tool runs of operation.

In some embodiments, the HDNN algorithm comprises a logistic regression (LR) algorithm and a dynamic neural network (DNN) algorithm.

In some embodiments, the tool wear monitoring and predicting method further includes storing the sets of factory machining conditions, the actual maximum tool life values, the relationship of actual tool wear to tool life, the sets of historical sensing data and the historical tool wear values into a database on a cloud layer; performing an operation of building the tool wear prediction model by using a cloud sever connected to the database, in which the cloud server is located on the cloud layer; downloading the tool wear prediction model into a cyber-physical agent (CPA) from the cloud server, wherein the cyber-physical agent is located on a factory layer, and the cyber-physical agent is communicatively connected to the cloud server through a networking layer; and obtaining and inputting the sets of sensing data into the tool wear prediction model from a tool machine mounted with the third cutting tool by using the cyber-physical agent, thereby obtaining the tool wear predicted value of the third cutting tool after each of the tool runs of operation.

In some embodiments, the tool wear monitoring and predicting method further includes filtering and converting the sets of historical sensing data and the set of sensing data into data corresponding to at least one feature type.

In some embodiments, the at least one feature type comprises a time domain, a frequency domain and/or a time-frequency domain.

In some embodiments, the operations of filtering and converting the sets of historical sensing data and the set of sensing data are performed using a wavelet de-noising method and fast Fourier transform (FFT) or discrete wavelet transform (DWT).

Thus, with the applications of the embodiments of the disclosure, a tool wear value and a RUL of a cutting tool mounted on a tool machine can be predicted in real time when the tool machine is in operation, and multiple tool machines using the same tool product can be simultaneously monitored and predicted.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
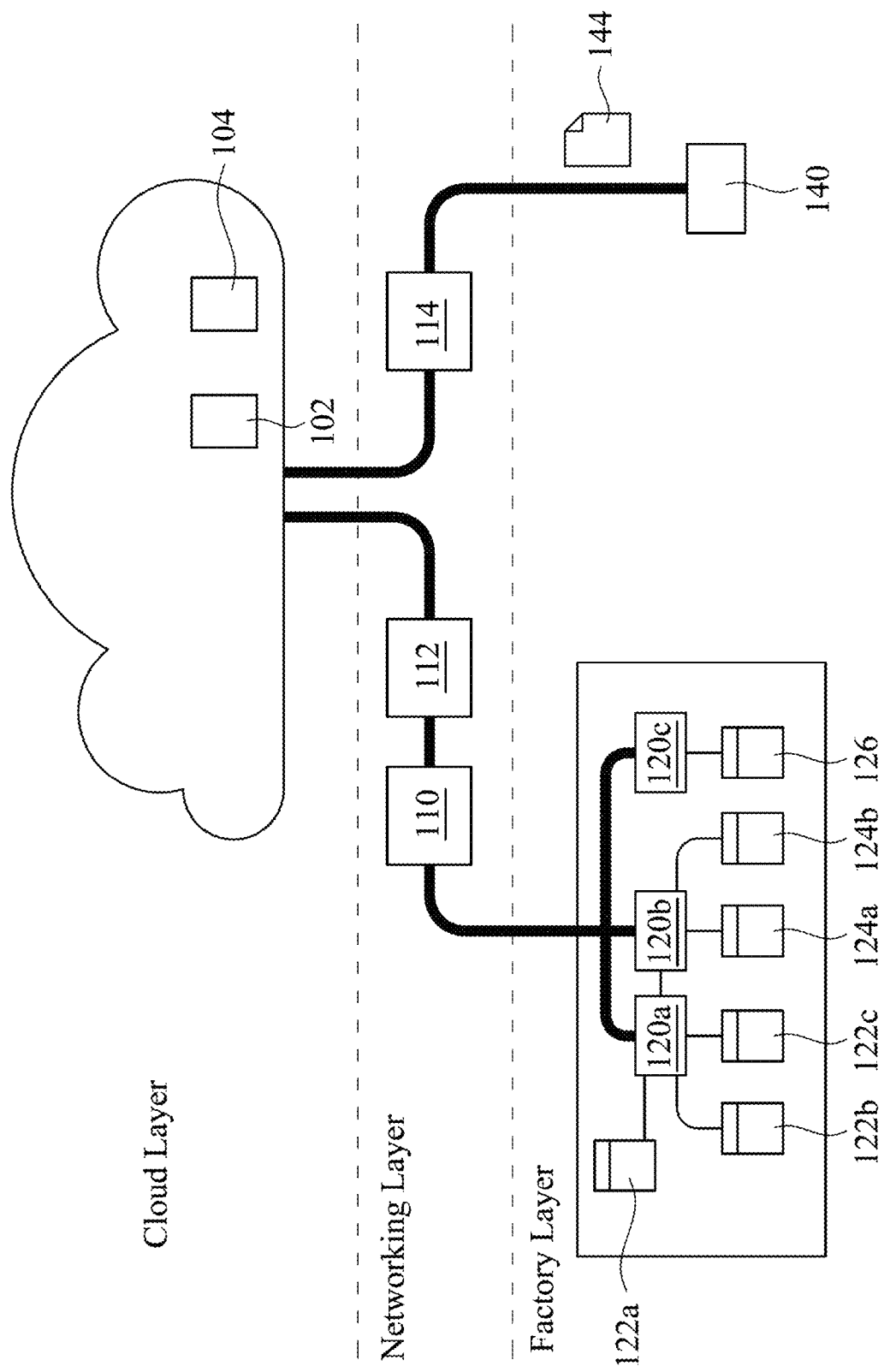
FIG. 1 is a schematic diagram showing a structure of a TCPP scheme in accordance with some embodiments of the disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, FIG. 1 is a schematic diagram showing a structure of a TCPP scheme in accordance with some embodiments of the disclosure. The TCPP scheme of the disclosure integrates cyber-physical agents (CPAs) 120$a$/120$b$/120$c$ on a factory layer, a gateway 110 and firewalls 112 and 114 on a networking layer, and a cloud server 102 and a cloud database 104 on a cloud layer. In the factory layer, the CPAs 120$a$/120$b$/120$c$ can communicate with multiple tool machines (such as computer numerical control (CNC) machine tools) 122$a$/122$b$/122$c$, 124$a$/124$b$, and 126, and obtain sensing data from those tool machines while the tool machines are performing cutting operations, and derive features from the sensing data. In practice, the use of these features may reduce the processing time, storage space, and samples for modeling. Through message routing by the gateway 110 and security verification by the firewalls 112 and 114 in the networking layer, the CPAs 120$a$/120$b$/120$c$ also transfer the features and the corresponding metrology data of tool wear to the cloud database 104. A tool vendor 140 provides sets of factory machining (cutting) conditions to the cloud database 144.

In the cloud layer, the cloud server 102 assists a user to achieve the following functions of (1) selecting key features; (2) deriving a maximum tool life (MTL) with the factory machining conditions recommended by the tool vendor 140; (3) build a HDNN (tool wear prediction) model according to the key features and the metrology data of tool wear; and (4) issuing messages to inform the CPAs 120$a$/120$b$/120$c$ when the HDNN model is ready. After receiving the ready message and downloading the HDNN model, the CPAs 120$a$/120$b$/120$c$ may predict the tool wear values of the cutting tools in the factory layer. In addition, the HDNN model includes a logistic regression (LR) model and a dynamic neural network (DNN) model. The LR model and the DNN model adopt the MTL and use wear features to diagnose tool failure and predict tool wear values simultaneously in the factory layer, in which Taylor's tool life equation suggests a default value of the MTL via the machining (cutting) condition. Furthermore, the HDNN models can be refreshed to be adapted to variations in tools and machines after receiving actual tool wear metrology data.

The cloud server 102 includes a processor and a memory. In one embodiment, the processor can be realized by, for example, one or more processors, such as central processors and/or microprocessors, but are not limited in this regard. In one embodiment, the memory includes one or more memory devices, each of which comprises, or a plurality of which collectively comprise a computer readable storage medium. The memory may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

Each of the CPAs is in charge of one or more tool machines. For example, the CPA 120$a$ is in charge of the tool machines 122$a$-122$c$; the CPA 120$b$ is in charge of the tool machines 124$a$ and 124$b$; and the CPA 120$c$ is in charge of the tool machine 126, in which the tool machines 122$a$-122$c$ use the same cutting tool product (type), and the tool machines 124$a$ and 124$b$ use the same cutting tool product (type). Because the tool machines 122$a$-122$c$ use the same cutting tool product (type), only one HDNN model is needed. Because the tool machines 124$a$ and 124$b$ use the same cutting tool product (type), only one HDNN model is needed. The cutting tool product may a lathe tool product or a mill tool product, for example.

Figure 2:
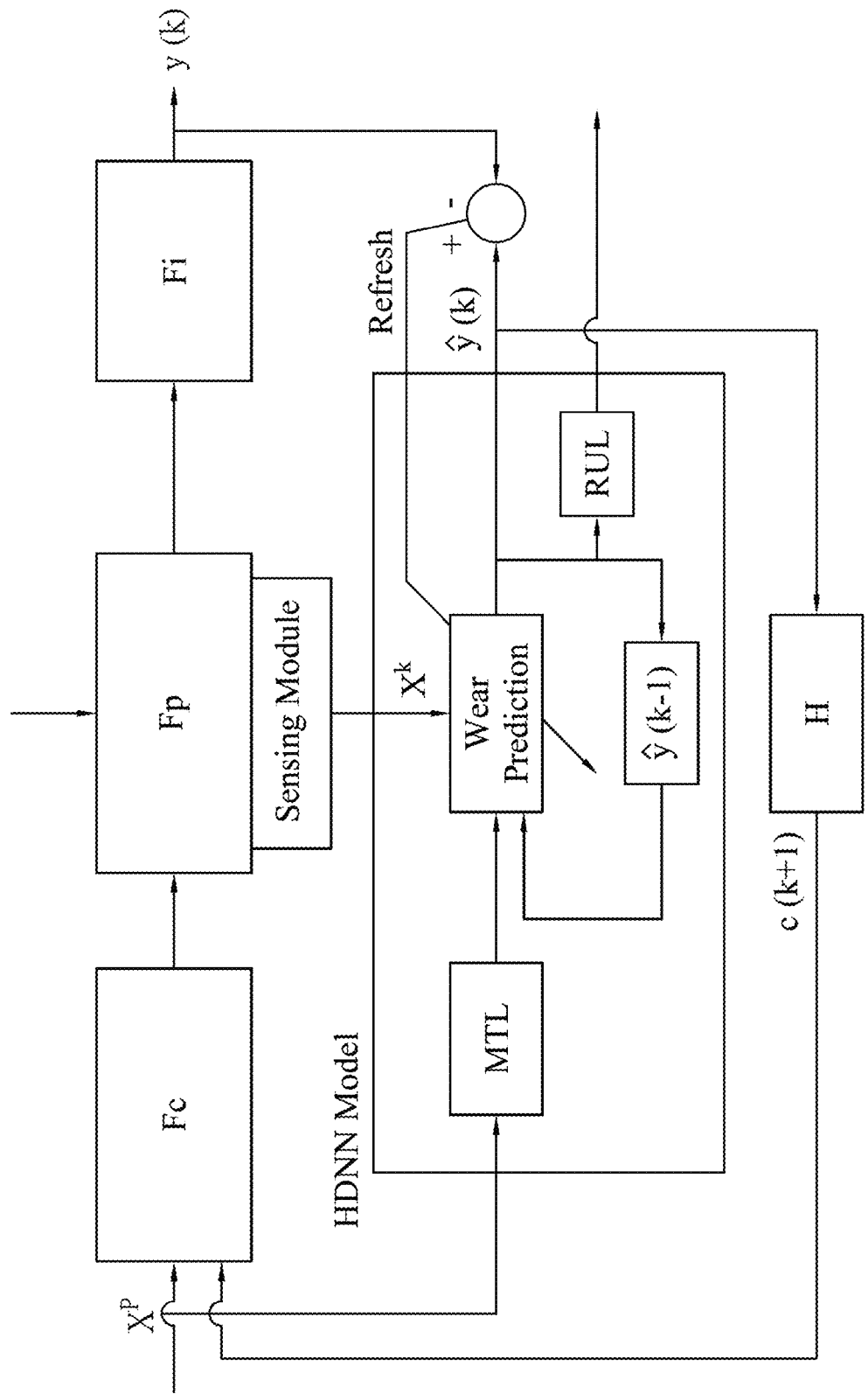
FIG. 2 is a schematic block diagram of applying a HDNN model for predicting cutting tool wear in accordance with some embodiments of the disclosure.

Hereinafter, a CNC machine tool is used as an example for explaining the HDNN model (i.e. the tool wear prediction model). Referring to FIG. 2, FIG. 2 is a schematic block diagram of applying a HDNN model for predicting cutting tool wear in accordance with some embodiments of the disclosure, in which $X^p$ represents actual machining (cutting) conditions for a cutting tool; y(k) represents an actual tool wear value of the cutting tool right after a $k^{th}$ tool run of operation; $X^k$ represents a set of sensing data of the cutting tool at the $k^{th}$ tool run of operation; and ŷ(k) represents a tool wear predicted value of the cutting tool right after the $k^{th}$ tool run of operation. The actual tool wear value y(k) can be modeled as a function of $X^p$, c(k+1), $F_c$, $F_p$, $F_i$ and D, in which c(k+1) is a tool compensation value generated by a compensator H right after a $(k+1)^{th}$ tool run of operation run and, and $F_c$, $F_p$, $F_i$ are functions of a CNC controller, a CNC plant, and a tool wear inspector respectively; D is denoted as a disturbance. In embodiments of the disclosure, the $k^{th}$ tool run of operation means that the $k^{th}$ workpiece is machined by the same cutting tool, or the same cutting tool performs the $k^{th}$ operation on the same or different workpieces. For the $k^{th}$ tool run of operation, the HDNN model adopts the actual machining (cutting) conditions $X^p$, the set of sensing data $X^k$ of the cutting tool, and a tool wear predicted value ŷ(k−1) of the cutting tool right after the $(k-1)^{th}$ tool run of operation (referred to as a previous tool wear predicted value), to predict the predicted value ŷ(k) of the cutting tool right after the $k^{th}$ tool run of operation, in which $X^k$ is extracted from a sensing module of the CPA. The MTL is derived from $X^p$. ŷ(k) is used to derive the RUL of the cutting tool right after the $k^{th}$ tool run of operation, which is denoted as $t_r(k)$. An error between y(k) and $ŷ(k)$ is used to refresh the HDNN model for model improvement.

Figure 3:
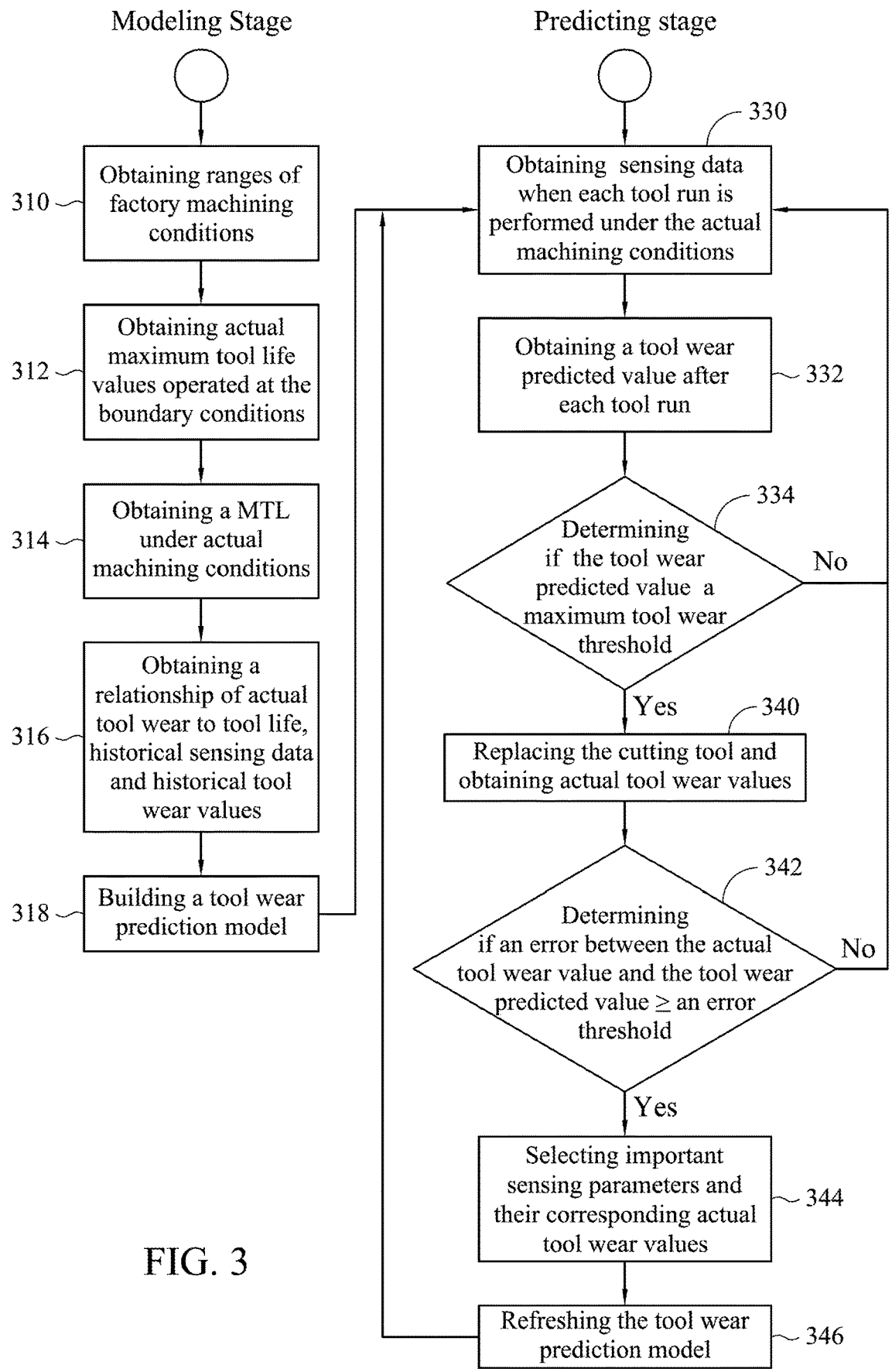
FIG. 3 illustrates a schematic flow chart showing a tool wear monitoring and predicting method in accordance with some embodiments of the disclosure.

Referring to FIG. 3, FIG. 3 illustrates a schematic flow chart showing a tool wear monitoring and predicting method in accordance with some embodiments of the disclosure. The tool wear monitoring and predicting method includes a modeling stage and a predicting stage, in which the HDNN (tool wear prediction) model is built in the modeling stage, and is refreshed in the predicting stage. The tool wear monitoring and predicting method uses three cutting tools having the same as one cutting tool product, i.e. the three cutting tools are of the same type, and referred to as a first cutting tool, a second cutting tool and a third cutting tool hereinafter, in which the first cutting tool and the second cutting tool are used to build the tool wear prediction model, and the tool wear prediction is used for predicting a tool wear value of the third cutting tool after each tool run of operation.

Figure 4A:
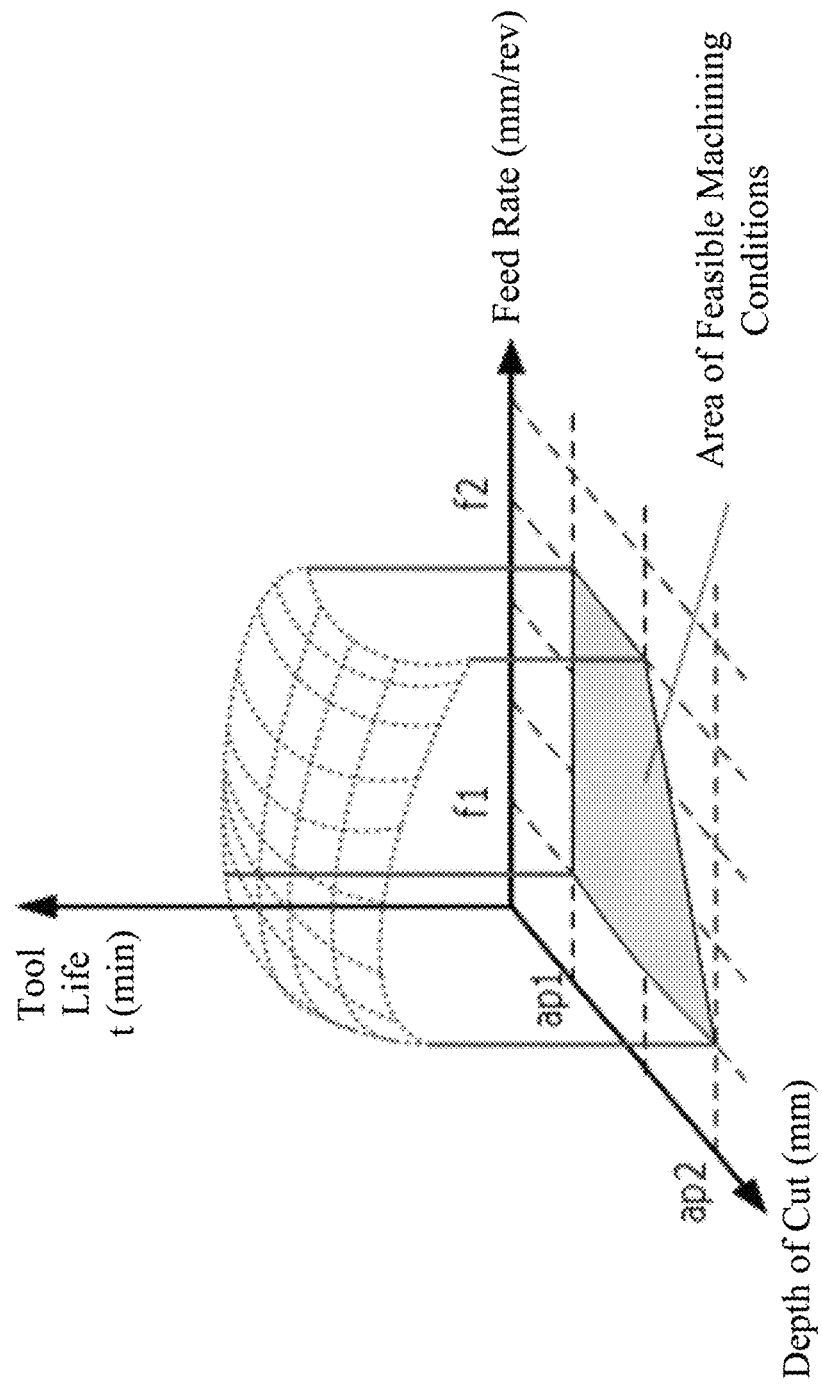
FIG. 4A is a schematic diagram showing factory machining conditions in accordance with some embodiments of the disclosure.

As shown in FIG. 3, in the modeling stage, operation 310 is first performed to obtain ranges of plural sets of factory machining conditions regarding a cutting tool product, in which the ranges of the sets of factory machining conditions are ranges of sets of factory machining conditions of the cutting tool product provided by the tool vendor. The ranges of the sets of factory machining conditions have plural boundary conditions. Referring to FIG. 4A, FIG. 4A is a schematic diagram showing factory machining conditions in accordance with some embodiments of the disclosure. The factory machining conditions include a feed rate, a depth of cut, a maximum spindle speed, etc. As shown in FIG. 4A, the ranges of the sets of factory machining conditions are a range of the depth of cut ($ap_1$, $ap_2$), and a range of the feed rate ($f_1$, $f_2$), and an area enclosed by boundary condition points ($ap_1$, $f_1$), ($ap_1$, $f_2$), ($ap_2$, $f_1$), ($ap_2$, $f_2$) is an area of feasible machining conditions that can be accessed according to the material and tolerance of the workpiece to be machined. The cutting speeds ($v_1$, $v_2$) can be derived from the depth of cut ($ap_1$, $ap_2$), and the feed rate ($f_1$, $f_2$).

Thereafter, operation 312 is performed to respectively perform plural life-determining operations on plural first cutting tools in accordance with the boundary conditions (such as the boundary condition points ($ap_1$, $f_1$), ($ap_1$, $f_2$), ($ap_2$, $f_1$), ($ap_2$, $f_2$)), thereby obtaining plural actual maximum tool life values of the cutting tool product operated at the boundary conditions, such as values of tool life (actual maximum tool life values) at the boundary condition points ($ap_1$, $f_1$), ($ap_1$, $f_2$), ($ap_2$, $f_1$), ($ap_2$, $f_2$). In each of the life-determining operations, one of the first cutting tools is continuously operated from its brand new condition until it is completely inoperable (the cutting tool cannot be used any more). The first cutting tools have the same type as the cutting tool product.

Then, operation 314 is performed to obtain a maximum tool life (MTL; $T_0$) of a second cutting tool under a set of actual machining conditions ($v_i$, $ap_i$, $f_i$) in accordance with a Taylor's tool life equation by using the actual maximum tool life values and the boundary conditions. The Taylor's tool life equation is shown as follows:

$$T_0^n v f^a a p^b = k \qquad (1)$$

where a and b are determined experimentally by the cutting conditions, n is an exponent that depends on the cutting conditions, and k is a constant.

Take logarithms of both sides of equation (1) and rewrite equation (1) in a linear form as follows:

$$\log T_0 = \frac{-1}{n}(\log v + a\log f + b \times \log ap - \log k) \qquad (2)$$

After the boundary condition points ($ap_1$, $f_1$), ($ap_1$, $f_2$), ($ap_2$, $f_1$), ($ap_2$, $f_2$) and actual maximum tool life values ($T_0$) corresponding thereto are introduced into equation (2), values of n, a and b can be obtained. For instance, the typical values of HSS (high speed steel) tools are a=0.77, b=0.37, and n=0.17. Then, the maximum tool life ($T_i$) of the second cutting tool for actual machining conditions $X^p(v_i, ap_i, f_i)$ can be derived by the following equation:

$$T_i = T_r \left( \frac{v_r f_r^a a p_r^b}{v_i f_i^a a p_i^b} \right)^{\frac{1}{n}} \qquad (3)$$

where $v_1 \leq v_r \leq v_2$, $f_1 \leq f_r \leq f_2$, and $ap_1 \leq ap_r \leq ap_2$, the suggested condition $X^r$ closest to $X^p$ is selected with $v_r \in \{v_1, v_2\}$, $f_r \in \{f_1, f_2\}$, and $ap_r \in \{ap_1, ap_2\}$.

Figure 4B:
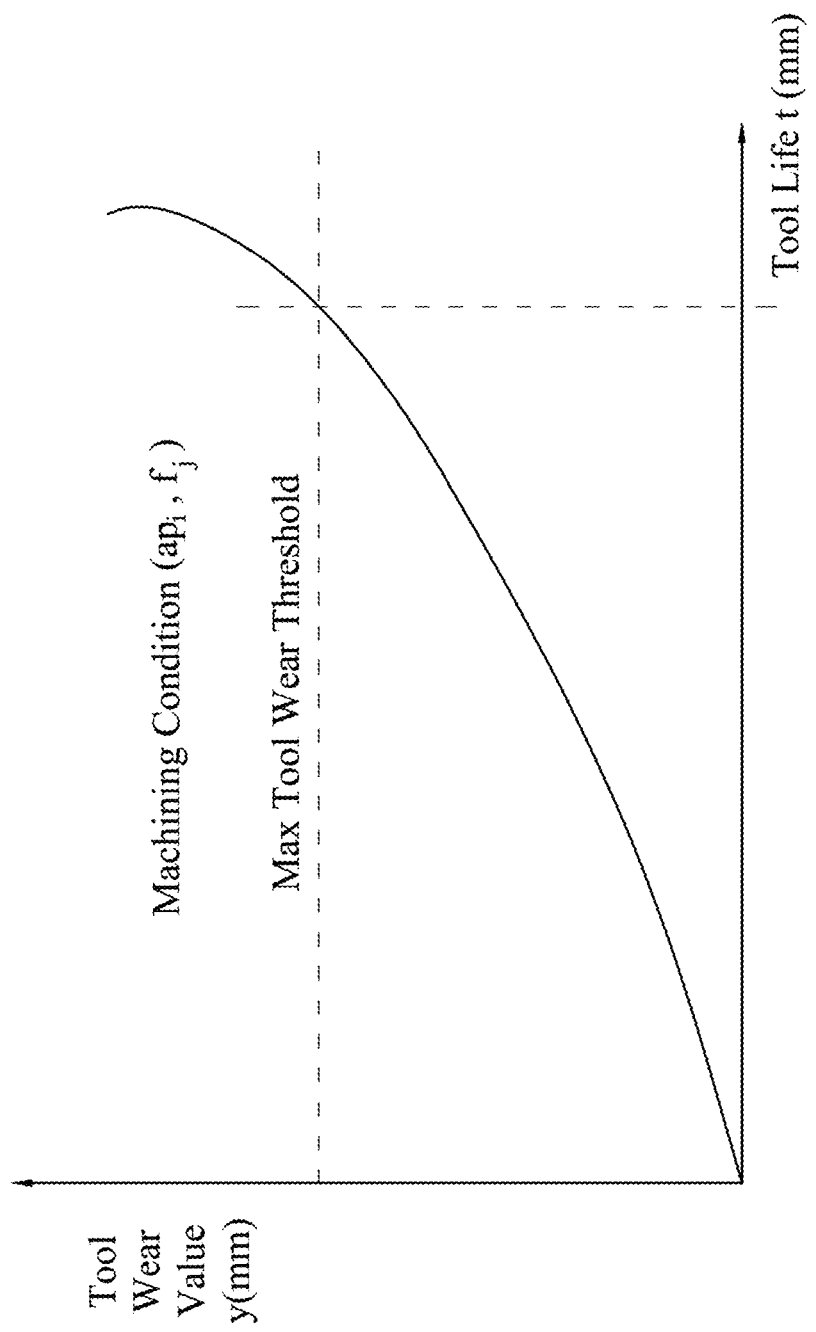
FIG. 4B is a schematic diagram showing a relationship of actual tool wear to tool life in accordance with some embodiments of the disclosure.

Thereafter, operation 316 is performed to sequentially perform plural historical tool runs of operation using the second cutting tool, thereby obtaining a relationship of actual tool wear to tool life, plural sets of historical sensing data and plural historical tool wear values, in which the historical tool wear values are corresponding to the sets of historical sending data and the historical runs of operation in a one-to-one manner. The second cutting tool has the same type as the cutting tool product. The historical tool wear value is a tool wear value of the second cutting tool after each historical tool run of operation, and is obtained by analyzing and measuring a cutting tool image captured by a digital microscope after each historical tool run of operation, for example, measuring the wear of the tool flank or tool corner. For example, the relationship of actual tool wear to tool life is shown in FIG. 4B, and has a maximum tool wear threshold. When the tool flank or tool corner of the cutting tool is broken, it means that the tool wear value is greater than the maximum tool wear threshold and needs to be replaced.

In some embodiments, sets of tool wear features may be extracted from the sets of historical sensing data. After the sets of historical sensing data are collected from the sensors attached to, for example, a spindle, axis drivers, and bearings to detect variations in vibration and cutting loading, the sets of historical sensing data are filtered and converted to data corresponding to at least one feature type, in which the feature type includes a time domain, a frequency domain and/or a time-frequency domain. In other words, the tool wear features are calculated in the time, frequency, and time-frequency domains of the historical sensing data. The time domain features include the root mean square (RMS), mean, max, min, standard deviation (std), and peak to peak (p2p). The frequency domain features consist of several harmonic powers where the harmonic powers are adjacency powers (±5 Hz) of times (x) of the fundamental frequency (kx, k=¼, ½, 1, . . . , 5) of the spindle speed. For example, if the cutting speed is 6000 rev/min, then the fundamental frequency is 100 Hz, and the 1× harmonic power ranges in frequency from 95 to 105 Hz. The time-frequency domain features are the wavelet package coefficients of the historical sensing data. The operations of filtering and converting the sets of historical sensing data are performed using a wavelet de-noising method and fast Fourier transform (FFT) or discrete wavelet transform (DWT).

Then, operation 318 is performed to build a tool wear prediction (HDNN) model in accordance with a HDNN algorithm by using the set of historical sensing data and the historical tool wear values, in which the HDNN model requires an input of a tool wear predicted of the cutting tool right after a previous tool run of operation.

After the modeling stage, the predicting stage begins. In the predicting stage, operation 330 is first performed to obtain plural sets of sensing data of a third cutting tool that is sequentially performing plural tool runs of operation under the set of actual machining conditions, in which the third cutting tool has the same type as the cutting tool product, and the tool runs of operation are corresponding to the sets of sending data in a one-to-one manner. In some embodiments, as described above, the set of sensing data is filtered and converted to data corresponding to the aforementioned feature type.

Thereafter, operation 332 is performed to input sets of sensing data and the maximum tool life under the set of actual machining conditions into the tool wear prediction model, thereby obtaining a tool wear predicted value of the third cutting tool right each of the tool runs of operation, wherein, when the tool wear predicted value of the third cutting tool after the each of the tool runs of operation is desired to be predicted, the tool wear predicted value of the third cutting tool at the tool run of operation right before the each of the tool runs of operation is required to be inputted into the tool wear prediction model, i.e. the HDNN model requires an input of a tool wear predicted of the cutting tool right after a previous tool run of operation. The RUL $\hat{t}_r(k)$ of the third cutting tool right after a tool run k is inversely proportional to the tool wear predicted value:

$$\hat{t}_r(k) = \begin{cases} \dfrac{Y_{max} - \hat{y}(k)}{Y_{max}} T_0, & \text{when } \hat{y}(k) \leq Y_{max} \\ 0, & \text{otherwise} \end{cases} \quad (4)$$

where $Y_{max}$ is the maximum tool wear threshold, $\hat{y}(k)$ is the tool wear predicted value after the $k^{th}$ tool run of operation; and $T_0$ denotes the MTL under the set of actual machining conditions $X^p$.

Then, operation 334 is performed to determine if the tool wear predicted value is greater than or equal to a maximum tool wear threshold. When the result of operation 334 is no, the method returns operation 330 to obtain a set of sensing data of the third cutting tool that is performing a next tool run of operation under the set of actual machining conditions, thereby obtaining a tool wear predicted value of the third cutting tool right after the next tool run of operation (operation 332).

When the result of operation 334 is yes, it represents that the third cutting tool has a tool wear exceeding the maximum tool wear threshold and needs to be replaced. Thus, operation 340 is performed to replace the third cutting tool, and to obtain an actual tool wear value of the third cutting tool after each tool run of operation, and to correlate the actual tool wear values with the sets of the sensing data. Then, operation 342 is performed to determine if an error between the actual tool wear value of the third cutting tool and the tool wear predicted value of the third cutting tool after each tool run of operation is greater than or equal to an error threshold. If the result of operation 344 is no, it means that the HDNN model does not need to be refreshed. If the result of operation 344 is yes, the HDNN model needs to be refreshed, in which operation 344 is first performed to select important sensing parameters and their corresponding actual tool wear values in accordance with the correlation coefficients (larger correlation coefficients) between the actual tool values and the sets of sensing data. Then, operation 346 is performed to refresh the tool wear prediction (HDNN) model by using the important sensing parameters and their corresponding actual tool wear values. After the HDNN model is refreshed, the method returns operation 330.

Figure 5:
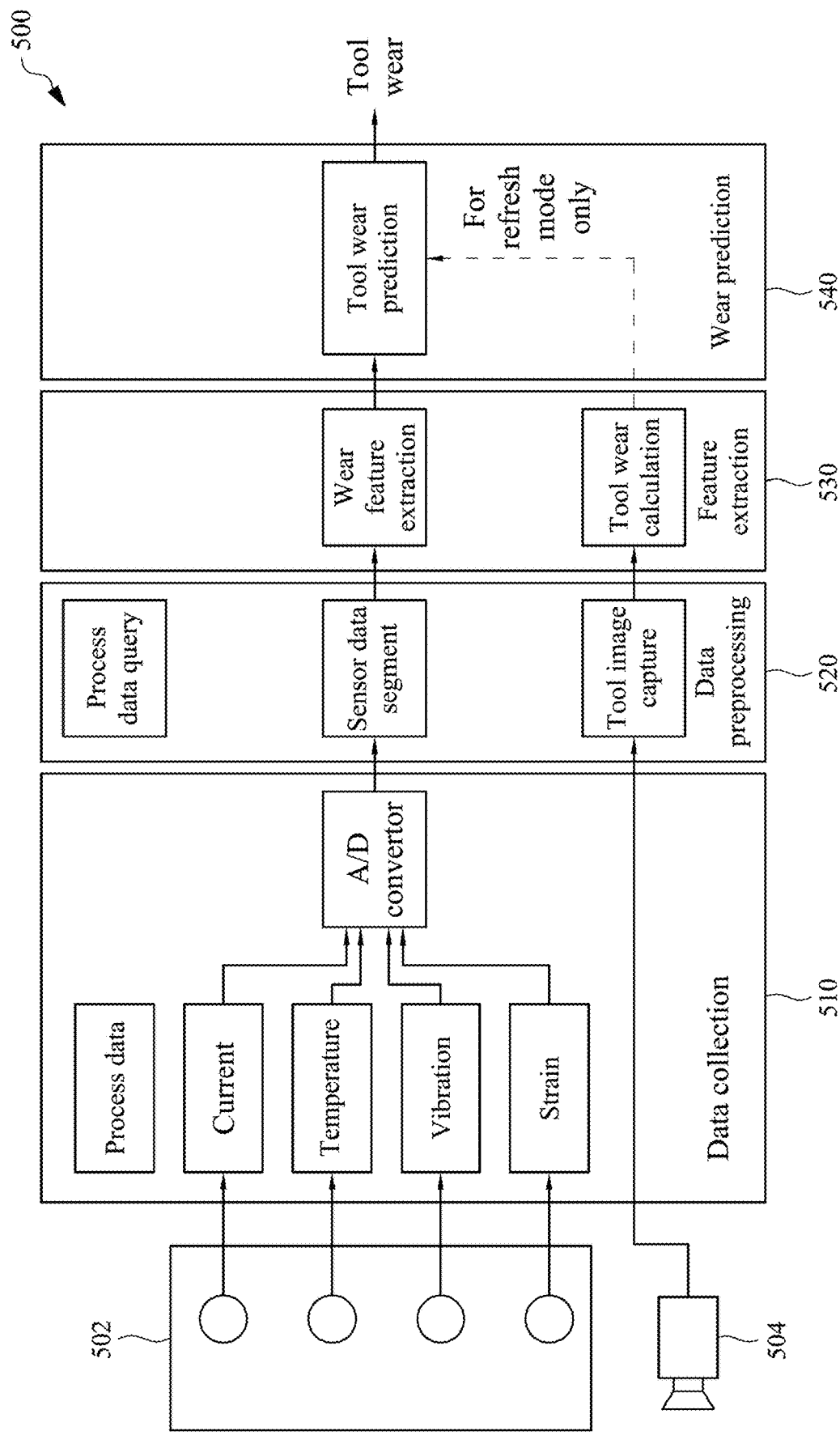
FIG. 5 is a schematic block diagram of a cyber physical agent (CPA) in accordance with some embodiments of the disclosure.

Hereinafter, an example is used to explain the structure of the CPA. Referring to FIG. 5, FIG. 5 is a schematic block diagram of a cyber physical agent (CPA) 500 in accordance with some embodiments of the disclosure, in which the CPA 500 has the same structure with the CPA 120a/120b/120c shown FIG. 1. The CPA 500 includes a data collection circuit 510, a data preprocessing circuit 520, a feature extraction circuit 530 and a wear prediction circuit 540, in which the circuits 510, 520, 530 and 540 are software or firmware circuits. The CPA 500 is communicatively connected to a tool machine 502 and a digital microscope 504. The tool machine 502 may be such as a CNC machine tool on which various sensors are installed, such as a current transducer, an accelerometer, a strain gauge, and a thermocouple, for detecting the statuses of axis motors and spindles during machining.

The data collection circuit 510 may collect loading, vibration, strain, and temperature signals from the current transducer, the accelerometer, the strain gauge, and the thermocouple, respectively. After an A/D convertor converts the signals from analog to digital format, the CPA 500 synchronizes the signals as raw data using the time stamps. Then, the data-preprocessing circuit 520 is used to query the process data, i.e., the machining (cutting) conditions including the feed rate, the spindle speed, and the coordinates, to segment the raw data using the triggered signals of the M Codes and to capture tool wear images from the digital microscope 504. In the data-preprocessing module 520, the cutting conditions are used to derive the MTL. The M codes are specified and programmed into the NC code to identify the related segments of the operation. The digital microscope 5-4 is installed in the machine tool to obtain tool wear images between two tool runs of operation, so as to build and refresh the HDNN model.

The feature extraction circuit 530 not only extracts the tool wear features according to the operation segments and feature domains but also derives the wear size from the tool wear images. The wear prediction circuit 540 uses the HDNN model to predict the tool wear and refresh the model to adapt to tool variations.

It can be known from the aforementioned embodiments that, the disclosure can predict a tool wear value and a RUL of a cutting tool mounted on a tool machine in real time when the tool machine is in operation, and simultaneously monitor and predict multiple tool machines using the same tool product.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims.

What is claimed is:

1. A tool wear monitoring and predicting method, comprising:
    obtaining ranges of a plurality of sets of factory machining conditions regarding a cutting tool product, wherein the ranges of the sets of factory machining conditions have a plurality of boundary conditions enclosing an area of feasible machining conditions;
    respectively performing a plurality of life-determining operations on a plurality of first cutting tools in accordance with the boundary conditions, thereby obtaining a plurality of actual maximum tool life values of the cutting tool product that are operated at the boundary conditions respectively, wherein the first cutting tools have the same type as the cutting tool product, and in each of the life-determining operations, one of the first cutting tools is continuously operated from its brand new condition until it is completely inoperable;
    obtaining a maximum tool life (MTL) of a second cutting tool under a set of actual machining conditions in accordance with a Taylor's tool life equation by using the actual maximum tool life values and the boundary conditions, wherein the second cutting tool has the same type as the cutting tool product;
    sequentially performing a plurality of historical tool runs of operation using the second cutting tool under the set of actual machining conditions, thereby obtaining a relationship of actual tool wear to tool life, a plurality of sets of historical sensing data and a plurality of historical tool wear values, wherein the historical tool wear values are corresponding to the sets of historical sensing data and the historical runs of operation in a one-to-one manner;
    building a tool wear prediction model in accordance with a hybrid dynamic neural network (HDNN) algorithm by using the set of historical sensing data and the historical tool wear values;
    obtaining a plurality of sets of sensing data of a third cutting tool that is sequentially performing a plurality of tool runs of operation under the set of actual machining conditions, wherein the third cutting tool has the same type as the cutting tool product, and the tool runs of operation are corresponding to the sets of sensing data in a one-to-one manner;
    inputting the sets of sensing data and the maximum tool life into the tool wear prediction model, thereby obtaining a tool wear predicted value of the third cutting tool after each of the tool runs of operation, wherein, when the tool wear predicted value of the third cutting tool after the each of the tool runs of operation is desired to be predicted, the tool wear predicted value of the third cutting tool at the tool run of operation right before the each of the tool runs of operation is required to be inputted into the tool wear prediction model;
    calculating a remaining useful life (RUL) of the third cutting tool by using the tool wear predicted value, the maximum tool life and the maximum tool wear threshold; and
    replacing the third cutting tool with a new cutting tool when the tool wear predicted value is greater than or equal to a maximum tool wear threshold.

2. The tool wear monitoring and predicting method of claim 1, further comprising:
    obtaining a tool life of the third cutting tool from the tool wear predicted value in accordance with the relationship of actual tool wear to tool life.

3. The tool wear monitoring and predicting method of claim 1, further comprising:
    obtaining the maximum tool wear threshold from the maximum tool life in accordance with the relationship of actual tool wear to tool life.

4. The tool wear monitoring and predicting method of claim 1, wherein the historical tool runs of operation are the same as the tool runs of operation.

5. The tool wear monitoring and predicting method of claim 1, wherein the HDNN algorithm comprises a logistic regression (LR) algorithm and a dynamic neural network (DNN) algorithm.

6. The tool wear monitoring and predicting method of claim 1, further comprising:
    storing the sets of factory machining conditions, the actual maximum tool life values, the relationship of actual tool wear to tool life, the sets of historical sensing data and the historical tool wear values into a database on a cloud layer;
    performing an operation of building the tool wear prediction model by using a cloud sever connected to the database, wherein the cloud server is located on the cloud layer;
    downloading the tool wear prediction model into a cyber-physical agent (CPA) from the cloud server, wherein the cyber-physical agent is located on a factory layer, and the cyber-physical agent is communicatively connected to the cloud server through a networking layer; and
    obtaining and inputting the sets of sensing data into the tool wear prediction model from a tool machine mounted with the third cutting tool by using the cyber-physical agent, thereby obtaining the tool wear predicted value of the third cutting tool after each of the tool runs of operation.

7. The tool wear monitoring and predicting method of claim 1, further comprising:
    filtering and converting the sets of historical sensing data and the set of sensing data into data corresponding to at least one feature type.

8. The tool wear monitoring and predicting method of claim 7, wherein the at least one feature type comprises a time domain, a frequency domain and/or a time-frequency domain.

9. The tool wear monitoring and predicting method of claim 7, wherein operations of filtering and converting the sets of historical sensing data and the set of sensing data are performed using a wavelet de-noising method and fast Fourier transform (FFT) or discrete wavelet transform (DWT).

\* \* \* \* \*